United States Patent [19]

Muto et al.

[11] Patent Number: 5,436,770
[45] Date of Patent: Jul. 25, 1995

[54] DISC RECORDING AND/OR REPRODUCING APPARATUS HAVING AN ENLARGED LOCKING RANGE FOR CORRECTLY PHASED INTERNAL CHANNEL CLOCKS

[75] Inventors: Takayasu Muto; Tamotsu Yamagami, both of Kanagawa, Japan

[73] Assignee: Sony Corporation, Tokyo, Japan

[21] Appl. No.: 195,855

[22] Filed: Feb. 10, 1994

[30] Foreign Application Priority Data

Feb. 12, 1993 [JP] Japan .................................. 5-024542
Feb. 19, 1993 [JP] Japan .................................. 5-030976

[51] Int. Cl.⁶ ...................... G11B 27/10; G11B 5/02; H04N 5/76
[52] U.S. Cl. ........................................ 360/51; 360/59; 369/59
[58] Field of Search ............... 360/26, 51, 59; 369/47, 369/48, 59

[56] References Cited

U.S. PATENT DOCUMENTS 4,688,205  8/1987  Abiko .................................. 360/51
5,170,383 12/1992  Yonezawa et al. ................... 360/59

FOREIGN PATENT DOCUMENTS 3-156774  7/1991  Japan .......................... G11B 20/14

*Primary Examiner*—Aristotelis Psitos
*Assistant Examiner*—Won Tae C. Kim
*Attorney, Agent, or Firm*—Limbach & Limbach

[57] ABSTRACT

A recording and/or reproducing device for detecting the servo pattern pre-recorded at a pre-set, interval on a disc-shaped recording medium, and for generating channel clocks, that is, clock signals for sampling data used during recording or reproduction on the basis of the detected information on the servo pattern, is disclosed. For providing the correctly phased channel clocks, a voltage controlled oscillator employed in the phase-locked loop of a channel clock forming unit, of the recording and/or reproducing device for generating the channel clocks is controlled not only by phase error data but also by positive phase error data and negative phase error data for enlarging the locking range for enabling correct phase locking. Besides, for providing correctly phased channel clocks for the disc-shaped recording medium of the constant angular velocity (CAV) system, the pickup position on the recording medium is detected so that the phase error detection data is corrected on the basis of the detected pickup position for providing the channel clocks phased in correspondence with the recording/replay position on the recording medium.

3 Claims, 9 Drawing Sheets

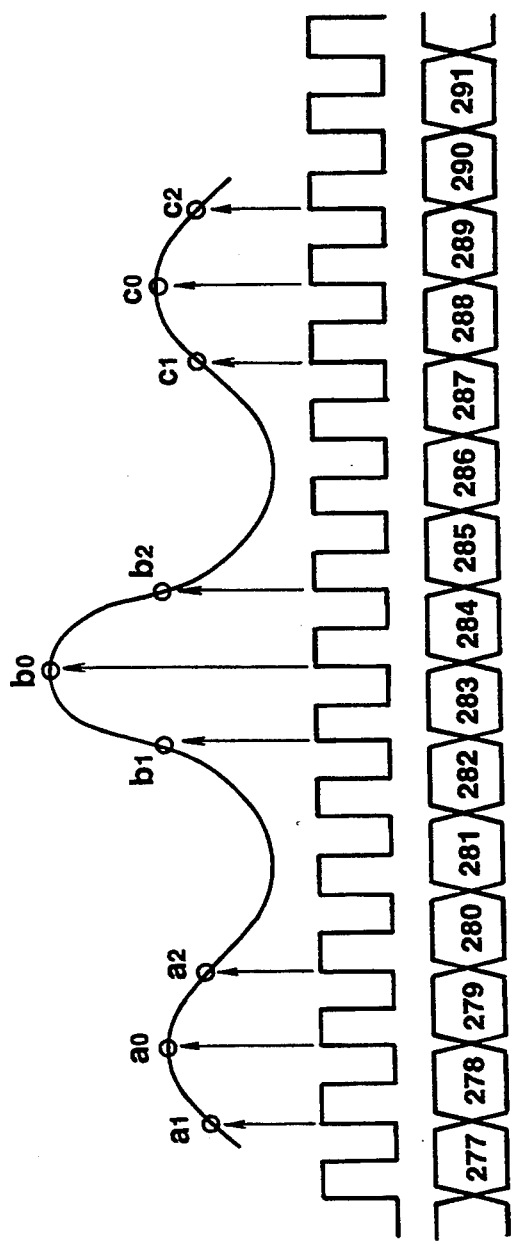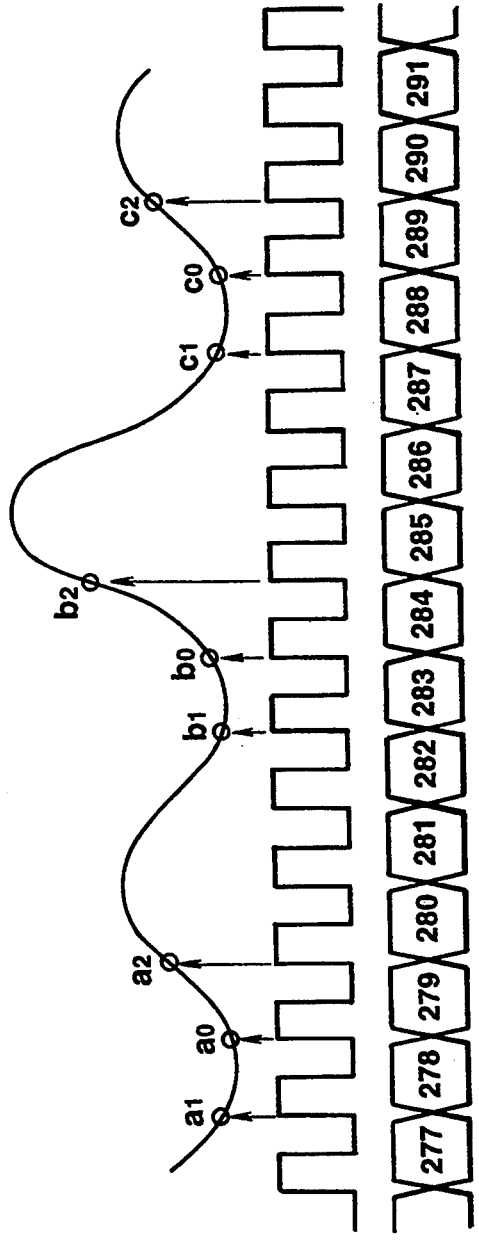
FIG.3(a) CHANNEL CLOCKS
(PRIOR ART)
FIG.3(b) CHANNEL CLOCKS
(PRIOR ART)

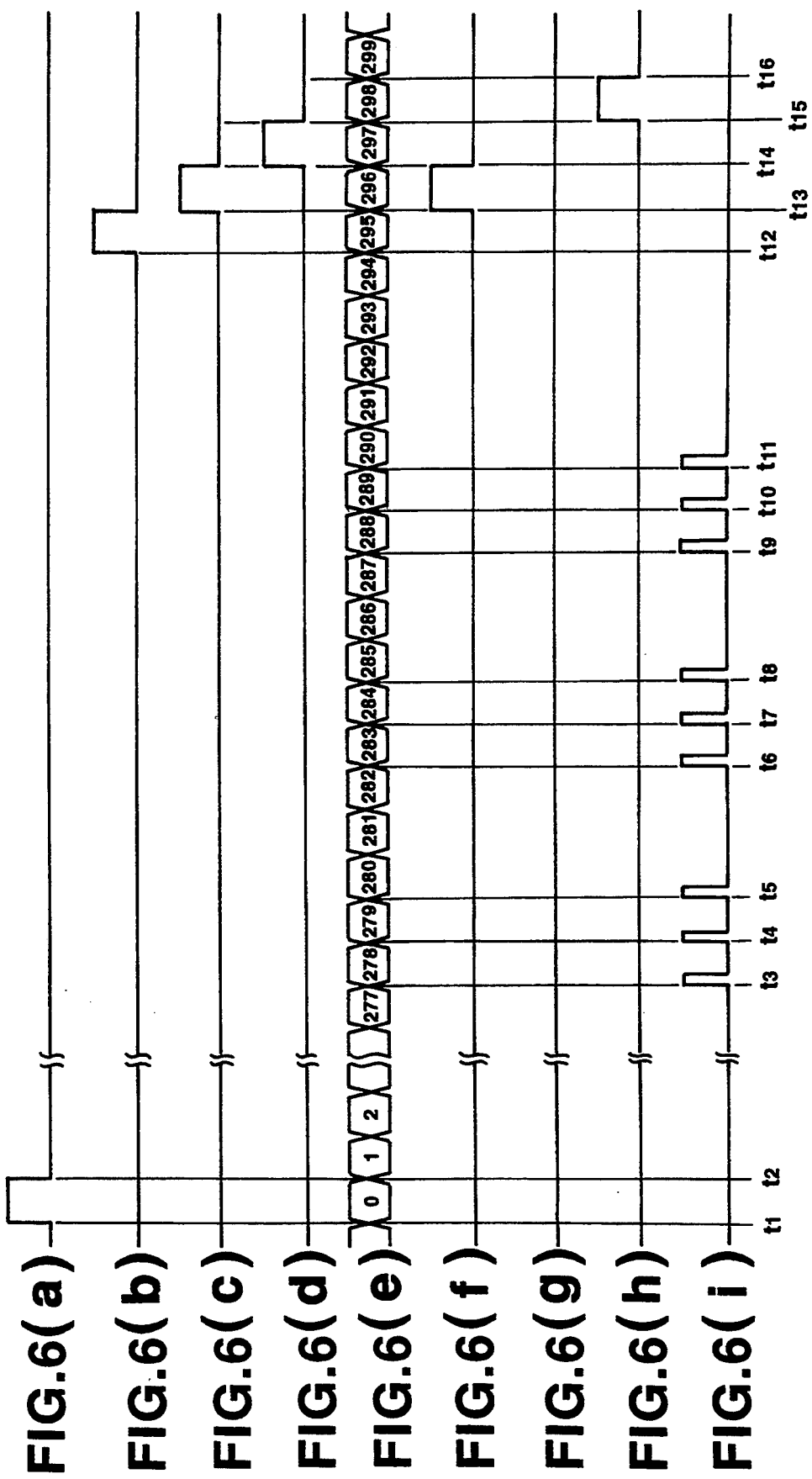

DISC RECORDING AND/OR REPRODUCING APPARATUS HAVING AN ENLARGED LOCKING RANGE FOR CORRECTLY PHASED INTERNAL CHANNEL CLOCKS

BACKGROUND OF THE INVENTION

This invention relates to a recording and/or reproducing device for detecting the servo pattern pre-recorded at a pre-set interval on a disc-shaped recording medium, such as an optical disc, magneto-optical disc or a magnetic disc, and for generating channel clocks based on the detected information on the servo patterns.

There has hitherto been known an optical disc of the sample servo system as shown in JP Patent KOKAI (Laid-Open) Publication No. 3-156774 (1991).

With the sampled servo system optical disc device, the channel clocks, which are clock signals for sampling data used during recording or reproduction, need to be phased correctly.

FIG. 1 shows an arrangement of a clock detection system for the optical disc as applied to a reproducing device for a magneto-optical disc.

The magneto-optical disc employed with the reproducing device shown in FIG. 1 is explained by referring to FIG. 2. The magneto-optical disc includes a number of servo areas each having recorded therein servo patterns each consisting of a pair of wobble pits 200 and a clock pit 201. Each pair of the wobble pits is offset towards the inner and outer peripheries from the center of a concentric track TR and the associated clock pit is formed on the center of the track TR intermediate between the wobble pits.

960 of the servo areas, for example, are formed for each circular turn of the track, with an area defined between a given servo area to the next servo area being a data area. Recording data modulated in a pre-set manner are photomagnetically recorded in the data area along with synchronization data, address data and the like.

Referring to FIG. 1, before proceeding to reproduction of recording data recorded on the magneto-optical disc, a servo pattern detection mode is set, in which the reproducing device for the magneto-optical disc causes the magneto-optical disc to be run in rotation by a spindle motor 100 for phase-matching the servo pattern detection data with the channel clocks.

During the servo pattern detection mode, the optical system 102 causes a laser beam to be radiated on the magneto-optical disc 101 to detect the return light beam. The recording data and the servo patterns recorded on the magneto-optical disc 101 are reproduced by photo-electric conversion of the return light beam for generating playback signals which are supplied to an amplifier 105.

The amplifier 105 amplifies the playback signals with a pre-set gain to supply the amplified playback signals to an A/D converter 106. The A/D converter 106 is fed with channel clocks from a voltage controlled oscillator VCO 111, the oscillation frequency of which is changed in dependence upon the voltage supplied thereto. The A/D converter 106 samples and digitizes the playback signals by the channel clocks for generating playback data which is supplied to a latch circuit 107.

Each servo pattern is made up of a pair of wobble pits 200 and a clock pit 201 disposed intermediate between the wobble pits 200 on the center of the track TR, as shown in FIG. 2. Thus the waveform of the reproduced data (sometimes referred to herein as replay data) for the servo pattern is such a waveform in which the waveform portions for the wobble pits 200 lower in level than the waveform portion for the clock pit 201 are present on both sides of the waveform for the clock pit 201 with the waveform for the clock pit 201 as the center.

If, when the channel clock from the VCO 111 is of a correct phase, the channel clocks start to be counted after detection of the servo pattern, and the playback data from the A/D converter 106 is latched as the count value becomes equal to 277 to 279, 282 to 284 and 287 to 289, the servo pattern may be latched correctly.

To this end, a servo pattern detection circuit, not shown, compares a pre-stored servo pattern and the playback data from the A/D converter 106 with each other for detecting the servo pattern and transmits the detected pulse to a counter, not shown. The counter is reset by the servo pattern detection pulse and, from this time on, starts counting the channel clocks. The counted value is supplied to a latch pulse outputting circuit, not shown. The latch pulse outputting circuit transmits a latch pulse to the latch circuit 107 when the count values become equal to e.g. 277 to 279, 282 to 284 and 287 to 289, as shown in FIG. 3a.

The latch circuit 107 latches the replay data by each latch pulse to latch the servo pattern replay data as shown in FIG. 3a for generating latch data at points a1, a0, a2, b1, b0, b2, c1, c0 and c2. These latch are supplied to a phase generator 108.

The phase comparator 108, thus fed with the servo pattern replay data, finds the phase errors between the channel clocks and the servo pattern replay data, by taking advantage of left-to-right symmetry of the three waveform portions, based on the level differences from points a0, b0 and c0, the center points of the respective waveform portions, to points a1, a2, b1, b2, c1 and c2, the hump or shoulder points spaced apart by one channel clock ahead and back of the center points a0 to c0, as shown in FIG. 3a, in accordance with the following equation 1

$$\text{phase error data} = \tfrac{1}{2}[(a2-a1)+(c2-c1)] \qquad (1)$$

to transmit the resulting phase error data to a D/A converter 109.

Meanwhile, the servo pattern replay data are employed for forming tracking error signals, tracking polarity signals (TPOL), which go to high level when an error is within $\pm\tfrac{1}{4}$ track from the track center, one-eighth off-track signals, which go to high level when an error exceeds $\pm\tfrac{1}{8}$ track from the track center, a detection signal of a mean wobble pit level detection signal, and a mirror area level detection signal, in accordance with the following equations:

$$\text{tracking error signal} = [(c0-a0)] \qquad (2)$$

$$\tfrac{1}{8} \text{ off-track signal} = [(b0<a0)+(b0<c0)] \qquad (3)$$

$$TPOL = [b0 > \tfrac{1}{2}(a0+c0)] \qquad (4)$$

$$\text{mean wobble pit level detection signal} = \tfrac{1}{2}(a0+c0) \qquad (5)$$

$$\text{mirror area level detection signal} = d0 \qquad (6)$$

respectively, where the mirror area is an area provided between the servo pattern and the data area.

The D/A converter 109 converts the phase error data into analog signals to form phase error signals which are supplied to a phase compensation circuit 110.

The phase compensator circuit 110 is constituted by e.g. a low-pass filter which frees the phase error detection signal of high-range noise components by way of phase compensation of the phase error signals to supply the resulting data to the VCO 111.

The VCO 111, which has its oscillation frequency varied in dependence upon the phase error signals, controls the channel clock phase so that the phase error of the channel clocks with respect, to the servo pattern replay data becomes equal to zero. These channel clocks are supplied to both the A/D converter 106 and the demodulating circuit 103.

As may be seen from the foregoing, the portion of the recording and/or reproducing device for the magneto-optical disc which forms the channel clocks constitutes a so-called phase-locked loop which outputs channel clocks phase-synchronized with the phase of the servo pattern replay data, When the channel clocks phase-synchronized with the phase of the servo pattern replay data start to be outputted, that is when the phase capturing or phase locking of the servo pattern replay data is terminated, the reproducing device for the magneto-optical disc terminates the servo pattern detection mode to shift to the replay mode of reproducing recording data recorded on the magneto-optical disc 101.

While in the replay mode, the reproducing device for the magneto-optical disc reads the recording data recorded on the magneto-optical disc 101. As mentioned above, the replay signals from the optical system 102 are supplied via the amplifier to the A/D converter 106, while being supplied to the demodulating circuit 103.

The A/D converter 106 generates the replay data based on the channel clocks to supply the data to the latch circuit 107. This allows the servo patterns to be latched to generate the phase error detection data based on which variable control of the output frequency of the VCO 111 is performed repeatedly.

The demodulating circuit 103 demodulates the replay signals from the amplifier 105, based on the channel clocks, and outputs the demodulated replay signals via an output terminal 104.

Since the channel clocks are phase-synchronized with the servo pattern detection data phase, as described above, the replay signals may be correctly sampled and demodulated by the demodulating circuit 103 to assure outputting of correct replay signals.

It is noted that, if the free-running frequency of the VCO 111 is deviated from the desired frequency or larger phase errors are produced after phase capturing and hence the frequency of the channel clocks generated by the VCO 111 is fluctuated significantly, the channel clock phase is deviated significantly from the phase of the servo pattern replay data, such that the latching circuit 107 performs the latching at the positions deviated from both humps or shoulders of the data waveform portions of the wobble pits 200, as shown for example in FIG. 3b. As a result thereof, correct phase error detection data cannot be formed by the phase generator 108, so that correctly phased channel clocks, that is channel clocks synchronized with the phase of the servo pattern detection data, cannot be outputted by the VCO 111.

The reason is that the ability of the phase error detection circuit 105 in forming the phase error detection data is narrow, as shown in FIG. 4, so that, if larger phase errors as referred to above are produced, the phase error detection circuit 105 is unable to generate the phase error difference data corresponding to the larger phase errors.

Consequently, the above-described reproducing device for the magneto-optical disc is provided with high precision clock generating circuit, such as a voltage-controlled quartz oscillator, as the VCO 111, for preventing the occurrence of the larger phase errors.

However, such high precision clock generating circuit is expensive, thus raising product, ion costs of the reproducing device for the magneto-optical disc to which the clock detection system for the optical disc is applied.

OBJECT AND SUMMARY OF THE INVENTION

In view of the above-depicted status of the art, it, is an object of the present invention to provide a recording-/reproducing device for a disc-shaped recording medium, in which occasionally produced larger phase errors may be corrected and correctly phased channel clocks may be outputted even when a less expensive lower precision VCO is employed.

BRIEF DESCRIPTION OF THE DRAWINGS

FIGS. 3a and 3b are waveform diagrams of servo pattern detection data for illustrating the arithmetic-logic operations for forming phase error data according to the prior art.

FIG. 6(a) is a timing chart showing a detection pulse of a detected servo pattern.

FIG. 6(b) is a timing chart showing a second window pulse corresponding to a channel clock phase lagging the servo pattern replay data.

FIG. 6(c) is a timing chart showing a second window pulse corresponding to a low channel clock phase error with respect to the servo pattern replay data.

FIG. 6(d) is a timing chart showing a second window pulse corresponding to a channel clock phase leading the servo pattern replay data.

FIG. 6(e) is a timing chart showing the channel clock value.

FIG. 6(f) is a timing chart showing the pulse sent to the positive phase difference output unit.

FIG. 6(g) is a timing chart showing the low level section signal from the lock/unlock detection circuit.

FIG. 6(h) is a timing chart showing the pulse sent to the negative pulse difference output unit.

FIG. 6(i) is a timing chart showing the latch pulses.

DETAILED DESCRIPTION OF THE PREFERRED EMBODIMENTS

Figure 5:
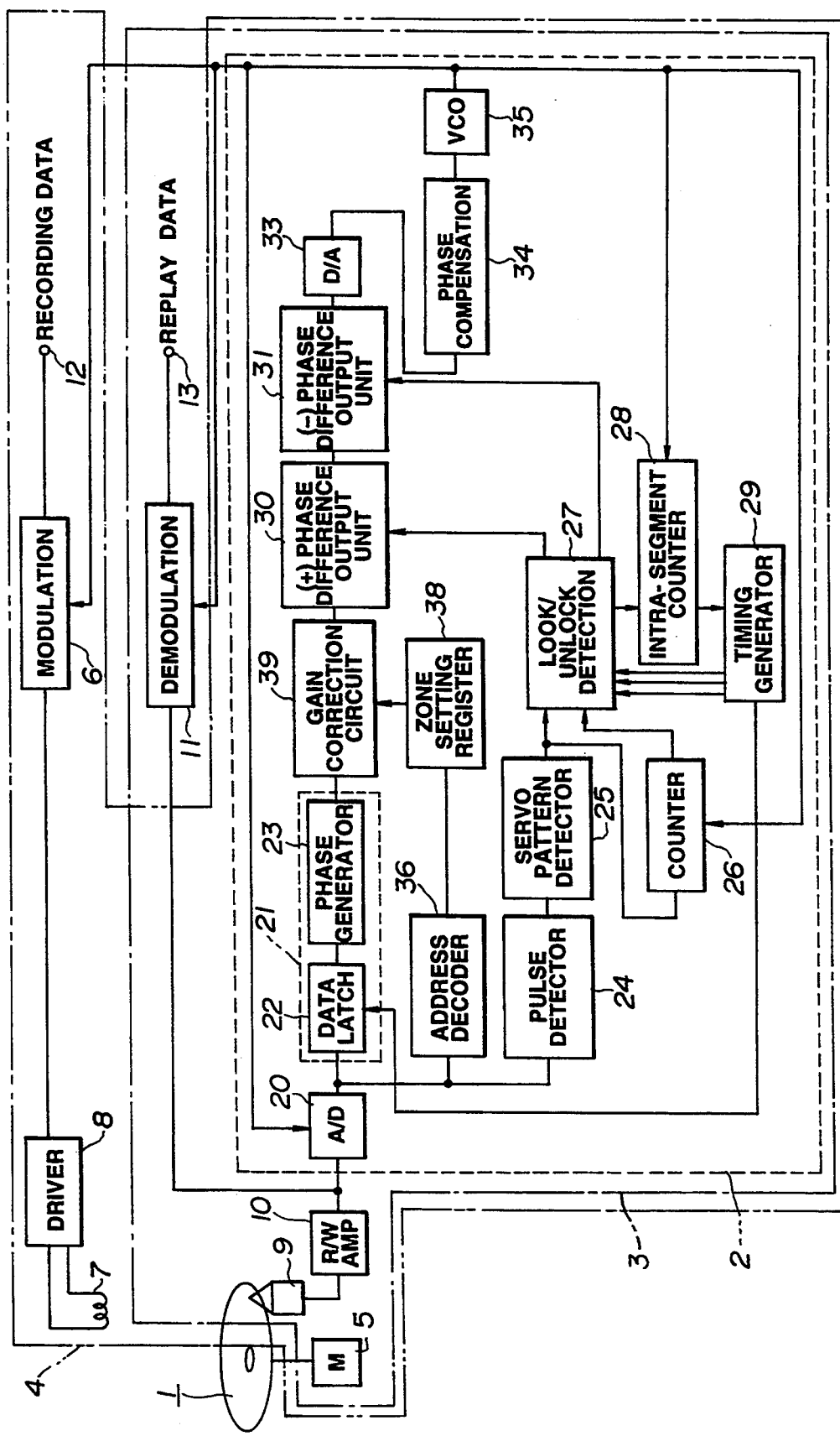
FIG. 5 is a block diagram showing an embodiment of an optical disc reproducing device employed in the present invention.

Referring to the drawings, in particular FIG. 5, preferred embodiments of the recording and/or reproducing device for a disc-shaped recording medium are explained in detail.

Figure 1:
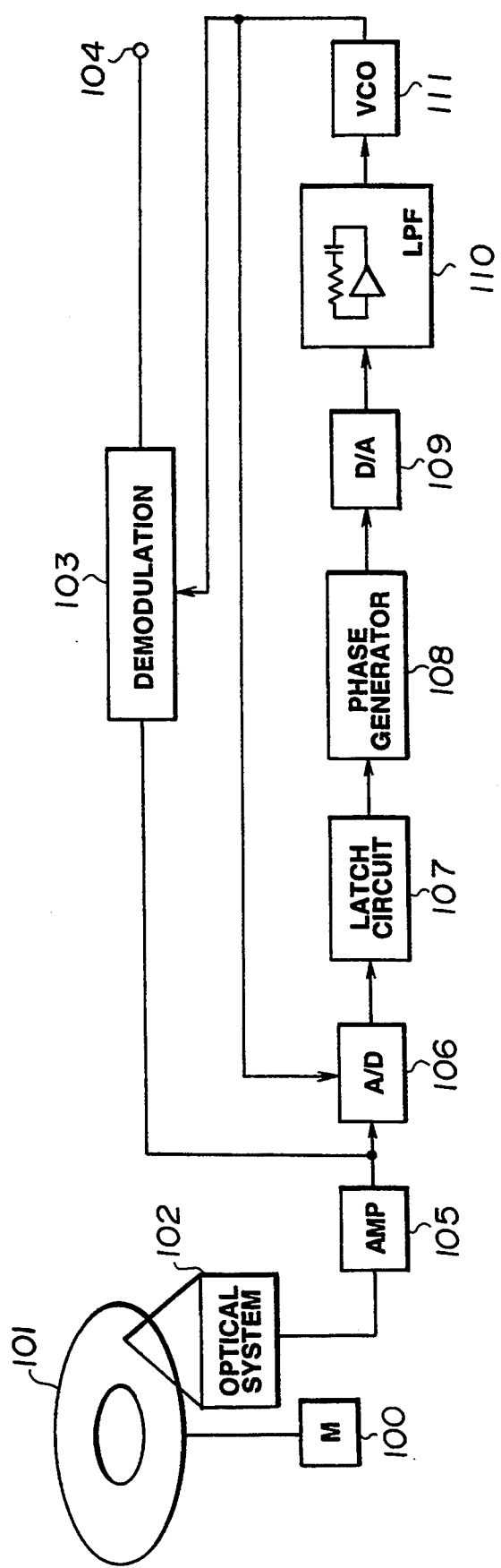
FIG. 1 is a block diagram showing a conventional reproducing device for a magneto-optical disc.
Figure 2:
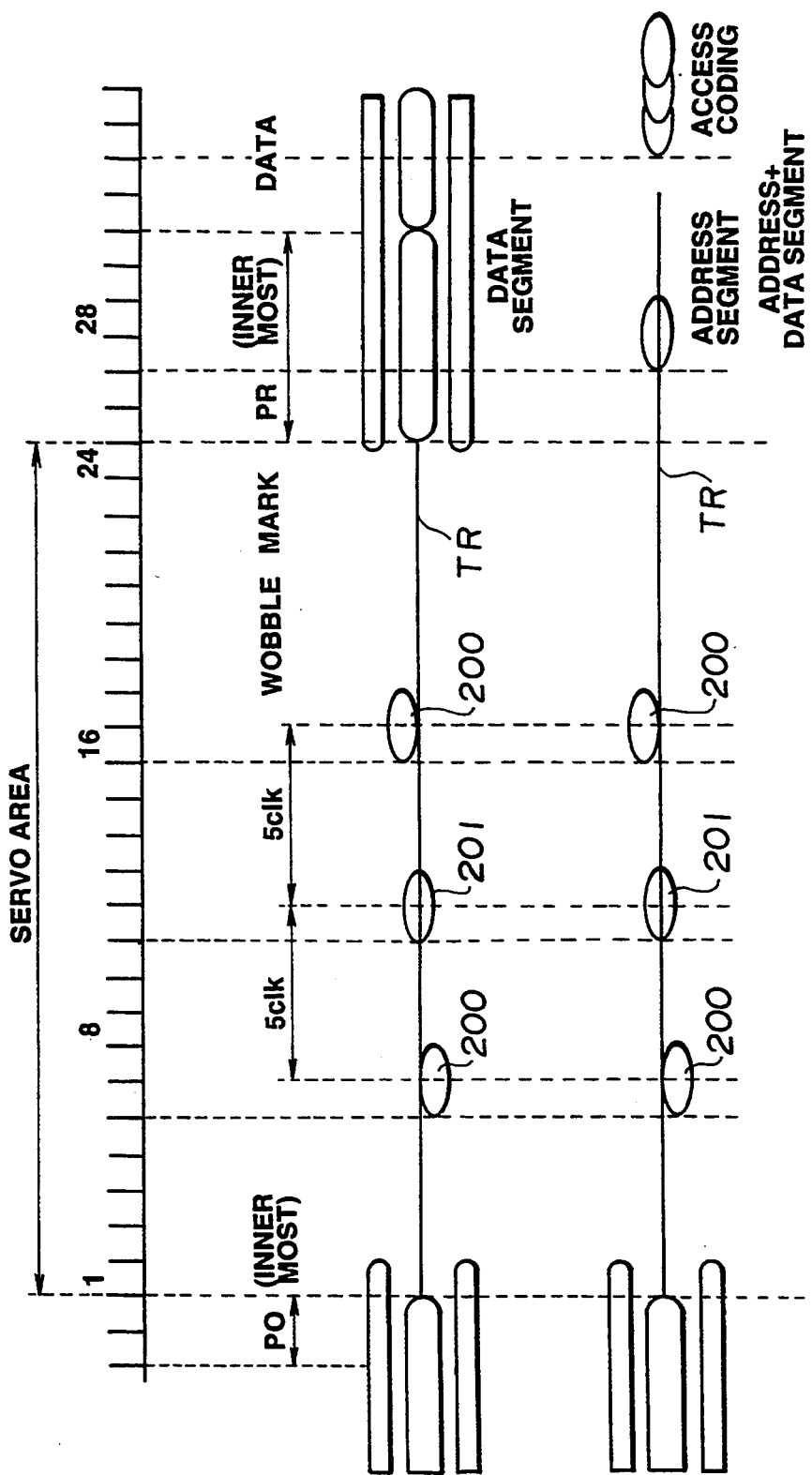
FIG. 2 shows the servo patterns on the magneto-optical disc formed by wobble pits.
Figure 4:
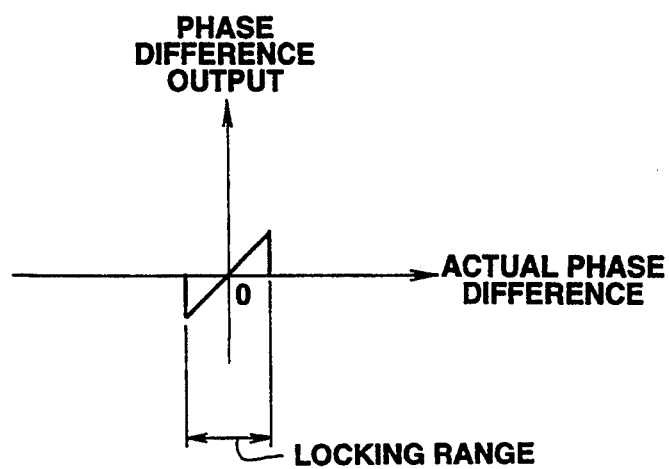
FIG. 4 shows locking ranges with the conventional reproducing device for a magneto-optical disc.

The recording and/or reproducing device for a disc-shaped recording medium according to the present invention is a recording/reproducing device for a magneto-optical disc 1, which is a disc-shaped recording medium shown in FIG. 2. The recording and/or reproducing device is made up of channel clock forming unit 2 for the disc-shaped recording medium, shown encircled by a dotted line, a reproducing system 3, shown encircled by a chain-dot, ted line, for reproducing the disc-shaped recording medium by the channel clock forming unit 2, and a recording system 4, shown by a double-dotted chain line, for recording data using the channel clock forming unit 2.

On the magneto-optical disc 1, there are arrayed a number of servo areas, each having pre-recorded thereon a servo pattern comprising a pair of wobble pits 200 and a clock pit 201, at a pre-set interval from each other, as shown in FIG. 2. The wobble pits are shifted from the center of a concentric track TR towards the inner and outer rims, while the clock pit is disposed on the track center and intermediate between the wobble pits 200. Meanwhile, the servo patterns are not so-called unique patterns, and are formed at a rate of 960 patterns for each turn of the track TR.

The area of the magneto-optical disc 1 other than the servo areas is the data area set for data. In this data area, there are alternately recorded synchronization data, address data and data actually required, and data management is performed on the basis of the synchronization data and address data. That is, the synchronization data is used for data segment synchronization, while the address data are used for enabling the recorded data to be recorded and/or reproduced on the frame or sector basis. It is noted that recording data are recorded with pre-set recording units in each data segment, as shown in FIG. 2.

Figure 9:
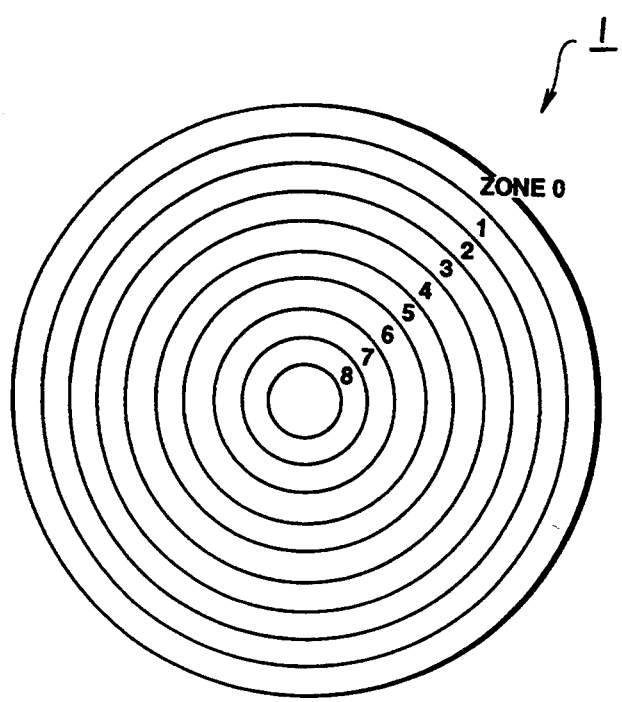
FIG. 9 is a schematic plan view showing an optical disc employed in the present invention.

Besides, the magneto-optical disc 1 is divided into nine zones 0 to 8 in the radial direction from the outer towards the inner rims thereof, as shown in FIG. 9.

The recording system 4 is made up of the channel clock forming unit 2, a spindle motor 5 for rotating the magneto-optical disc 1 at e.g. the constant angular velocity, a modulating circuit 6 for modulating the recording data in a pre-set manner depending on the channel clocks from the channel clock forming unit 2, a driver 8 for driving a magnetic head 7, an optical system 9 for radiating a laser beam on the magneto-optical disc 1, and a read/write (R/W) amplifier 10 for amplifying the replay signals from the optical system 9 for forming output pit signals.

The reproducing system 3 is made up of the spindle motor 5, optical system 9, R/W amplifier 10, channel clock forming unit 2 and a demodulating circuit 11 for demodulating the recording data reproduced from the optical system 9 at the timing as set by the channel clocks from the channel clock forming unit 2.

The channel clock forming unit 2 has the constitution of a PLL circuit. More concretely, the channel clock forming means 2 includes an A/D converter 20 for forming and outputting pit data by sampling pit signals from the R/W amplifier 10 with the channel clocks and digitizing the sampled data, a phase data forming circuit 21 for detecting phase errors of the channel clocks relative to the phase of the servo pattern and for forming and outputting phase error data, a pulse detection unit 24 for generating replay data from pit data supplied from the A/D converter 20 and a servo pattern detector 25 having the servo pattern pre-stored therein and adapted for detecting whether or not the replay data of the pulse detector 24 coincide with the pre-stored servo pattern data.

Meanwhile, the phase data forming circuit 21 is made up of a data latch circuit 22 for latching the pit data with timing pulses as later explained and a phase generator 23 for performing arithmetic-logic operations as later explained on the basis of the pit data latched by the data latching circuit 22 for detecting the phase errors.

The channel clock forming unit 2 also includes a positive phase difference outputting unit 30 for selectively outputting the phase error data supplied from the phase generator 23 or positive phase error data indicating that the channel clock is deviated in phase in a pre-set amount in a positive direction relative to the phase of the servo pattern detection data, a negative phase difference outputting unit 31 for selectively outputting the phase error data or negative phase error data indicating that the channel clock is deviated in phase in a pre-set amount in a negative direction relative to the phase of the servo pattern detection data, a counter 26 reset by a servo pattern detection pulse from a servo pattern detection unit 25 as a trigger and adapted for generating and outputting the first window pulse for detecting the servo pattern of the next segment by counting a pre-set number of the channel clocks, and a lock/unlock detection circuit 27, as controlling means, for detecting the phase error of the channel clocks relative to the detection data of the servo pattern based on the first window pulse from the counter 26 or a second window pulse as later explained and controlling the positive phase difference outputting unit 30 or the negative phase difference outputting unit 31 based on the detected results.

The channel clock forming unit 2 also includes an intra-segment counter 28 reset by servo pattern detection data on detection of a servo pattern in the window as indicated by the first window pulse in the lock/unlock detection circuit 27 for starting the counting of the channel clocks, and a timing generator 29 for forming the second window pulse depending on the count value from the intra-segment counter 28 for supplying the second window pulse to the lock/unlock detection circuit 27, while forming latch pulses depending on the count value for supplying the thus formed latch pulses to the data latching circuit 22.

The channel clock forming unit 2 also include an D/A converter 33 for converting the phase error signals from the phase error forming circuit 21, the phase error data from the positive phase difference outputting unit 30 or the phase error data from the negative phase difference outputting unit 31 into analog signals and outputting the resulting analog data, a phase compensation circuit 34, as a low-pass filter, for phase-compensating the phase error signals from the D/A converter 35 and outputting the resulting phase-compensated phase error signals, and a voltage-controlled oscillator (VCO) 35 for forming channel clocks whose frequency is changed on the basis of the phase error signals from the phase compensating circuit 34 for supplying the resulting channel clocks to the demodulating circuit 6 of the recording system 4 and to the demodulating circuit 11 of the replay system 3.

The channel clock forming means 2 also include an address decoder 36 for outputting position detection data during the servo pattern detection mode as later explained, replay mode and the recording mode for indicating the pickup position or zone on the magneto-optical disc 1, a zone setting register 38 for setting the recording/replay zone on the magneto-optical disc 1 for outputting zone-setting data, and a gain correction circuit 39 having its gain changed in accordance with the zone-setting data from the zone-setting register 38 and adapted for amplifying the phase difference from the phase generator 23 with the thus changed gain for outputting the amplified phase error data.

Before the recording and/or reproducing device proceeds to the recording or playback of the recording signals, the servo pattern detection mode is set, in which the channel clock forming unit 2 proceeds to the phase matching between the servo pattern detection data and the channel clocks.

In the servo pattern detection mode, the spindle motor 5 is run in rotation at a constant angular velocity. Thus the magneto-optical disc 1 is rotationally driven with the rotation of the spindle motor 5. The optical system 9 radiates the weak laser beam for replay on the rotationally driven magneto-optical disc 1 for detecting the return light. The return light is photo-electrically converted for reproducing the servo pattern and the recording data recorded on the magneto-optical disc 1. These replay signals are supplied as pit signals to the R/W amplifier 10.

The R/W amplifier 10 amplifies the pit signals with a pre-set gain to supply the amplified signals to the A/D converter 20 which is fed with the channel clocks from the voltage-controlled oscillator (VCO) 35 which has its oscillation frequency changed depending on the voltage supplied thereto. The A/D converter 20 generates pit data by sampling the pit signals with the channel clocks and digitizing the resulting signals, and routes the resulting pit data to the data latch circuit 22, an address decoder 36 and to the pulse detecting unit 24.

The pulse detection unit 24 differentiates the pit data to find the pit data corresponding to the point of inflection from the positive gradient to the negative gradient of the waveform shown in FIG. 3, and forms a pit data string in which the value of the detected pit data is "1" and other pit data are "0". The replay data composed of the pit data string are routed to the servo pattern detection unit 25.

The data having the same pattern as the servo pattern formed on the magneto-optical disc 1 is pre-stored in the servo pattern detection unit 25. The servo pattern detection unit 25 compares the data of the pre-stored servo pattern to the replay data and, on coincidence of the two data, routes a servo pattern detection pulse to the counter 26 and the lock/unlock detection circuit 27.

The counter 26 is fed with the channel clocks from the VCO 35. The counter 26 resets the count value using the servo pattern detection pulse as a trigger and starts counting the channel clocks as from the time it is reset.

If the channel clocks outputted from the VCO 35 are of the correct phase, the time which elapses from when the servo pattern detection pulse is supplied to the lock-/unlock circuit 27 until the servo pattern detection pulse is supplied next is equal to the time for 296 channel clocks, which the time required to reproduce ONE segment. Based on the count value, the counter 26 predicts the time when the next servo pattern detection pulse is to be supplied to the lock/unlock detection circuit 27. When the count value reaches 296, which is the predicted time, the counter 26 generates the first window pulse and routes the generated pulse to the lock/unlock circuit 27.

If the servo pattern detection pulse is fed to the lock-/unlock circuit 27 at the same time the first window pulse is supplied thereto, the lock/unlock circuit 27 routes a detection pulse to the intra-segment counter 28.

Similarly to the counter 26, the intra-segment counter 28 is fed with the channel clocks from the VCO 35, and resets the count value, as shown in FIG. 6e, using the detection pulse shown between time t1 and time t2 in FIG. 6a as a trigger. The intra-segment counter 28 counts the channel clocks as from the time when the count value is reset, and routes the count, value to the timing generator 29.

The timing generator 29 generates latch pulses, as shown in FIG. 6i, at time points t3, t4 and t5 when the count value shown in FIG. 6e reaches 277, 278 and 279 clocks, respectively, at time points t6, t7 and t8 when the count value shown in FIG. 6e reaches 282, 283 and 284 clocks, respectively, and at time points t9, t10 and t11 when the count value shown in FIG. 6e reaches 287, 288 and 289 clocks, respectively, and routes the latch pulses to the data latch circuit 22.

Since the servo pattern is formed by a pair of wobble pits 200 and the clock pit 201 disposed on the center of the track TR intermediate between the wobble pits 200, as shown in FIG. 2, the waveform of the replay data of the servo pattern is composed of a waveform portion for the clock pit 201, and waveform portions for the wobble pits 200, lower in level than the waveform portion for the clock pit 201, on either side of the waveform portion of the clock pit 201, as shown in FIG. 3a.

The data latching circuit 22 latches the pit data from the A/D converter 20 by the latch pulses supplied thereto when the count value from the intra-segment counter 28 becomes equal to 277 to 279, 282 to 284 and to 287 to 289 to form latch data a1, a0, a2, b1, b0, b2, c1, c0, c2 to route the latch data to the phase generator 23.

The phase generator 22, thus fed with the servo pattern replay data, finds the phase errors between the channel clocks and the servo pattern replay data, by taking advantage of left-to-right symmetry of the three waveform portions, based on the level differences from points a0, b0 and c0, the center points of the respective waveform portions, to points a1, a2, b1, b2, c1 and c2, the hump or shoulder points spaced apart by one channel clock ahead and back of the center points a0 to c0, as shown in FIG. 3a, in accordance with the following equation (7)

$$\text{phase error data} = \tfrac{1}{2}[(a2-a1)+(c2-c1)] \quad (7)$$

to transmit the resulting phase error data to the positive phase difference outputting unit 30 and to the negative phase difference outputting unit 31 via a gain correction circuit 39.

The timing generator 29 also predicts plural time points when the servo pattern detection pulse will be supplied next time to the lock/unlock detection circuit 27, based on count values from the intra-segment counter 28, and gene rates the second window pulse shown in FIG. 6b between time points t12 and t13 when the count value shown in FIG. 6e becomes equal to 295 clocks, while generating the second window pulse shown in FIG. 6c between time points t13 and t14 when the count value shown in FIG. 6e becomes equal to 296 clocks and generating the second window pulse shown in FIG. 6d between time points t14 and t15 when the count value shown in FIG. 6e becomes equal to 297 clocks. These second window pulses are routed to the lock/unlock detection circuit 27.

If the output channel clocks from the VCO 35 are of a correct phase, the replay time for one segment, that is the time which elapses since the servo pattern detection pulse is supplied to the lock/unlock circuit 27 until the next servo pattern detection pulse is supplied thereto, is equal to 296 channel clocks. Thus, if the servo pattern detection pulse is supplied from the servo pattern detection unit 25 as the second window pulse as shown in FIG. 6b is supplied during the time between t12 to t13 when the count value shown in FIG. 6e becomes equal to 295, the lock/unlock detection circuit 27 concludes that the channel clock phase is delayed significantly from the servo pattern replay data, and routes a pulse between time points t13 and t14 shown in FIG. 6f to the positive phase difference outputting unit 30.

The positive phase difference outputting unit 30 comprises a selector and, when fed with the pulse from the lock/unlock detection circuit 27, transmits positive phase error data, indicating that the channel clock phase is deviated by a pre-set value in the positive direction with respect to the phase of the servo pattern detection data, to the D/A converter 33, in place of the phase error data from the phase generator 23.

On the other hand, if the servo pattern detection pulse is supplied from the servo pattern detection unit 25 as the second window pulse as shown in FIG. 6c is supplied during the time between t13 to t14 when the count value shown in FIG. 6e becomes equal to 296 clocks, the lock/unlock detection circuit 27 concludes that the phase error detection data generated by the phase generator 23 is proper. In such case, the lock/unlock detection circuit 27 routes a low-level selection signal, shown in FIG. 6g, to the positive phase outputting unit 30 and to the negative phase outputting unit 31.

When fed with the low-level selection signal, the positive phase outputting unit 30 and the negative phase outputting unit 31 route the phase error data from the gain correction circuit 39 directly to the D/A converter 33.

On the other hand, if the servo pattern detection pulse is supplied from the servo pattern detection unit 25 as the second window pulse as shown in FIG. 6d is supplied during the time between t14 to t15 when the count value shown in FIG. 6e becomes equal to 297, the lock/unlock detection circuit 27 concludes that the channel clock phase significantly leads the servo pattern replay data, and routes a high-level select signal between time points t15 and t16 shown in FIG. 6i to the negative phase difference outputting unit 31.

When fed with the pulse from the lock/unlock detection circuit 27, the negative phase difference outputting unit 31 transmits negative phase error data, indicating that the channel clock phase is deviated by a pre-set value in the negative direction with respect to the phase of the servo pattern detection data, to the D/A converter 33, in place of the phase error data from the phase generator 23.

The D/A converter 33 converts the phase error data, positive phase error data or the negative phase error data into corresponding analog data to generate phase error signals, positive phase error signals or the negative phase error signals to transmit these signals to the VCO 35 via the phase compensation circuit 34.

The VCO 35 causes the frequencies of the output channel clocks to be changed depending on the phase error signals, positive phase error signals or the negative phase error signals to route the channel clocks to the A/D converter 20, modulating circuit 6, counter 26 and to the intra-segment counter 28.

Thus the channel clock forming unit 2 is in a PLL circuit configuration, in which the lock/unlock detection circuit 27 detects the phase errors of the channel clocks with respect to the servo pattern detection data. If the phase error is of a small value, the VCO 35 is driven by the phase error data generated by the phase generator 23. Conversely, if the phase error is of a larger value, it is detected whether the phase error is of a positive or negative value. If the phase error is positive, the VCO 35 is driven by the positive phase error data from the positive phase difference outputting unit 30, instead of by the phase error data generated by the phase generator 23. IF the phase error is negative, the VCO 35 is driven by the negative phase error data from the negative phase difference outputting unit 31, instead of by the phase error data generated by the phase generator 23.

Figure 7:
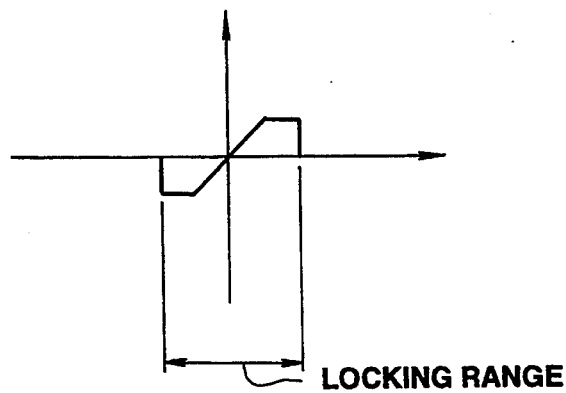
FIG. 7 shows a locking range for the optical disc reproducing device shown in FIG. 5.

Since the VCO 35 may be controlled in this manner not only by the phase error data, but also by the positive phase error data or the negative phase error data, the locking range may be enlarged, as shown in FIG. 7.

Consequently, even when the free-running frequency of the VCO 35 is deviated from the desired target frequency, the servo pattern detection data may be phase-locked quickly.

If, after phase locking, a larger phase error is generated to produce significant fluctuations of the channel clocks generated by the VCO 35, the phase once locked can be rendered difficult to be unlocked. Besides, if the phase, once locked, is disengaged, phase re-locking may be achieved promptly.

Since the locking range may be enlarged with the above-described channel clock forming unit, 2, the above-described effect may be achieved with the use of inexpensive low-precision VCO as the VCO 35, so that the channel clock forming unit 2 itself and hence the recording and/or reproducing device for the magneto-optical disc. may be manufactured inexpensively.

In the timing generator 29, it is possible to generate the second window pulse at the count value of 294 clocks and to enable still larger positive phase error data to be outputted from the positive phase difference outputting unit 30 when the servo pattern detection data is supplied whilst the second window pulse is transmitted to the lock/unlock circuit 27. Conversely, it is also possible to generate the second window pulse at the count value of 298 clocks and to enable still larger negative phase error data to be outputted from the negative phase difference outputting unit 31 when the servo pattern detection data is supplied whilst the second window pulse is transmitted to the lock/unlock circuit 27.

Figure 8:
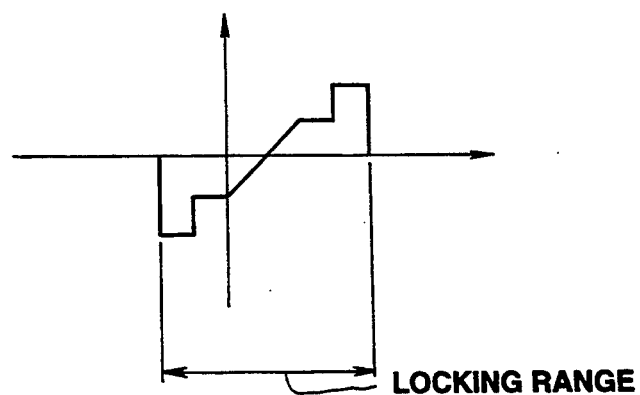
FIG. 8 shows a locking range for a modification of the optical disc reproducing device shown in FIG. 5.

In such case, the locking range of the channel clock forming unit 2 may be enlarged further, as shown in FIG. 8.

Meanwhile, since the servo pattern is not the so-called unique pattern, it may occur that the servo pattern coincides with the replay data pattern. Consequently, should only the counter 26 be employed, the counter 26 is reset when the pattern of the replay data is mistakenly detected as being the servo pattern data, so that subsequent first window pulses are outputted at mistaken timings, with the result that phase locking of the servo pattern detection data cannot be achieved subsequently.

However, since the intra-segment counter 28 is provided in the present channel clock forming unit 2 so as to be reset when two servo pattern detect, ion pulses have entered on end into the first window pulse and the next, first window pulse, and the servo pattern detection pulse is detected by the second window pulse generated when the count value of the intra-segment counter reaches a pre-set count value, the servo pattern may be detected correctly even although the servo pattern, is not the unique pattern.

Thus the latch pulses may be supplied at the timings allowing the data latching circuit 22 to latch the servo pattern correctly.

On termination of the phase locking of the servo pattern detection data, the recording and/or reproducing device for the magneto-optical disc 1 terminates the servo pattern detection mode and shifts to the recording mode or the replay mode, whichever is designated.

As may be seen from the foregoing, it is possible for the channel clock forming unit 2 to effect phase capturing of the servo pattern detect, ion data quickly owing to the increased locking range and to re-capture the phase even if the phase, once captured, becomes disengaged. Thus it becomes possible with the recording and/or reproducing device for the magneto-optical disc to reduce the time required for recording the recording data.

The recording data thus recorded on the magneto-optical disc 1 may be reproduced during the replay mode.

When the recording and/or reproducing device for the magneto-optical disc is in the replay mode, the weak replay laser beam is radiated from the optical system 9 on the magneto-optical disc 1 to produce the return light beam from which the recording data recorded on the magneto-optical disc 1 is reproduced. The replay signals are routed via the R/W amplifier 10 to the demodulating circuit 11.

The demodulating circuit 11 is fed with the channel clocks from the VCO 35. Thus the demodulating circuit 11 demodulates the recording data based on these channel clocks to output the demodulated data as replay data at an output terminal 13.

Owing to the above-described enlarged locking range, it becomes possible with the channel clock forming unit 2 to effect quick phase capturing of the servo pattern detection data or to re-capture the phase even if the phase, once captured, is disengaged. Thus it becomes possible with the recording and/or reproducing device for the magneto-optical disc to reduce the time required for reproducing the recording data.

It is noted that, since the recording data is recorded on the magneto-optical disc 1 in accordance with the constant angular velocity (CAV) system, the lengths of the pits constituting the servo pattern are longer at the outer periphery than at the inner periphery of the disc.

Consequently, the recording and/or reproducing device for the magneto-optical disc, in which the phase error detection data is produced from the level difference between both humps of the replay waveform portions for the servo pattern replay data, suffers from the drawback that the open-loop gain is fluctuated in proportion to the gradient of the servo pattern replay data with respect to time.

Figure 11A:
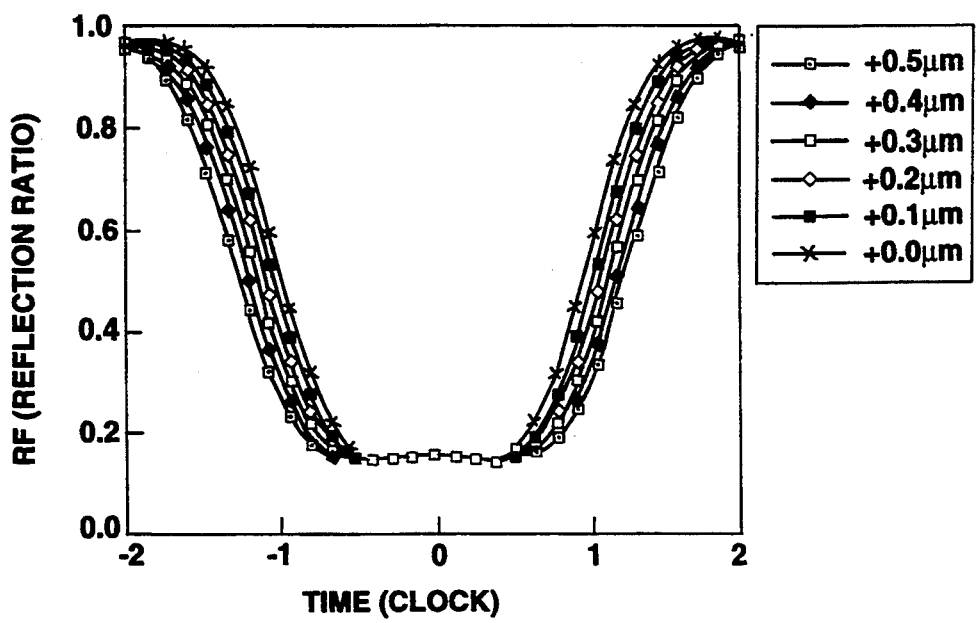
FIGS. 11a and 11b are graphs showing servo pattern data outputted by the optical disc.
Figure 11B:
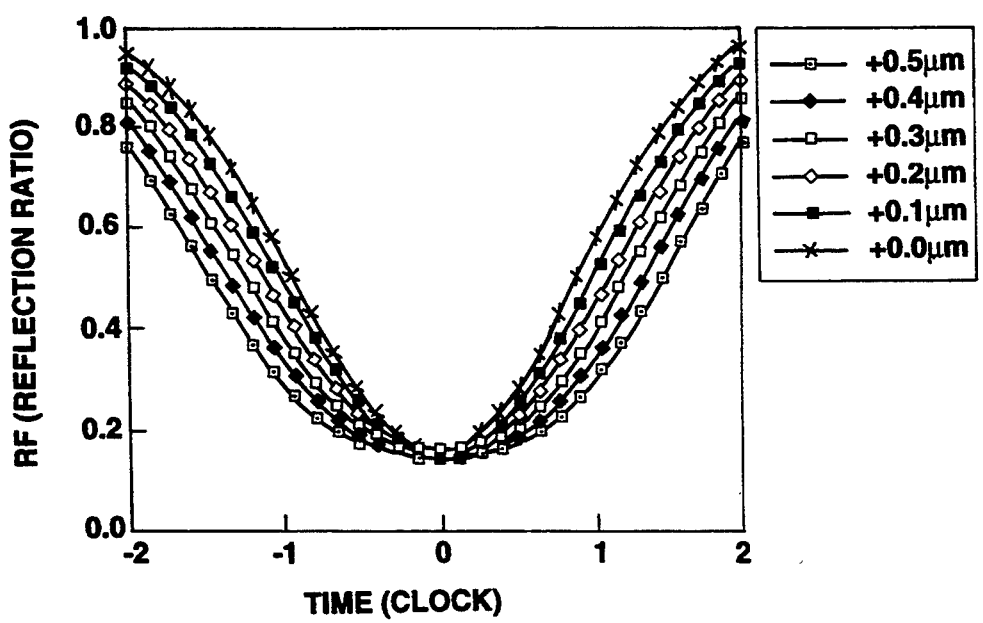

Specifically, should the modulation transfer function (MTF) characteristic of the servo pattern replay data be changed at, the inner and outer peripheries of the magneto-optical disc 1, the output gradient, of the servo pattern detection data is increased on the outer periphery of the magneto-optical disc 1 as indicated in FIG. 11a, although no such problem is incurred on the inner periphery of the magneto-optical disc 1 as indicated in FIG. 11b. Thus it becomes impossible to output the correctly phased channel clocks during reproduction or during reproduction and recording if the recordable recording medium is used, thus producing a hindrance in the reproduction and/or recording of the recording data.

Thus the address decoder 36 is employed for detecting in which zone on the magneto-optical disc 1 the pickup provided in the optical system 9 is located, and transmits the position data to the zone-setting register 38. Meanwhile, the address decoder 36 discriminates the zone based on the address data contained in the pit data. A position sensor or the like may also be used for detecting the pickup position.

The zone-setting register 38 sets zone numbers 0 to 8 depending on the position data. The zone setting data, which is the setting data, is supplied to the gain correction circuit 39.

Figure 10:
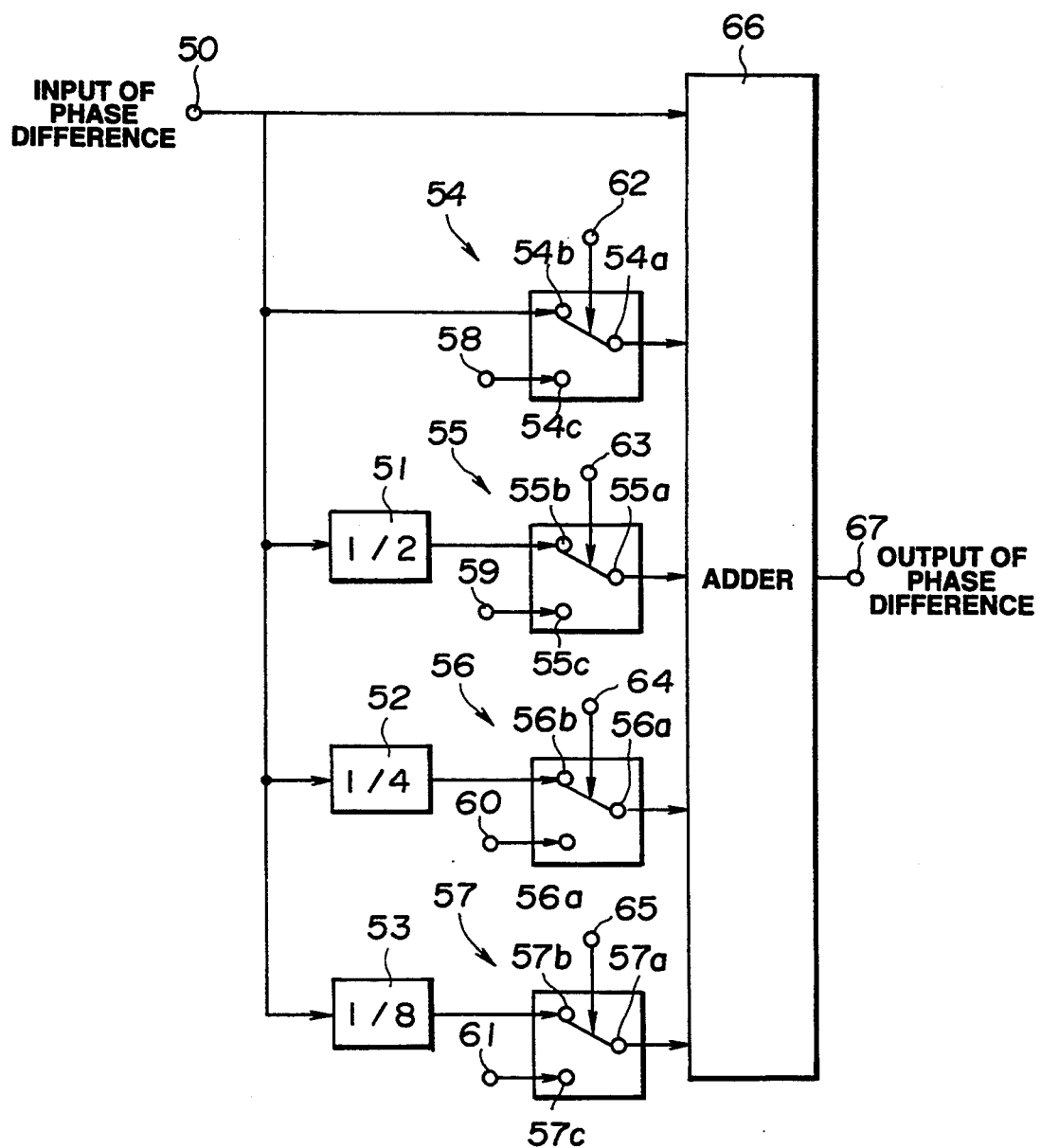
FIG. 10 is a block diagram showing a gain correction circuit employed in the present invention.

Referring to FIG. 10, the gain correction circuit 39 is made up of a first switch 54 for selecting the phase error data or zero-data, a divide-by-2 circuit 51 for multiplying the phase error data by ½ for outputting the resulting data, a divide-by-4 circuit 52 for multiplying the phase error data by ¼ for outputting the resulting data, a divide-by-8 circuit 53 for multiplying the phase error data by ⅛ for outputting the resulting data, a second switch 55 for selecting the phase error data from the divide-by-2 circuit 51 or the zero data and outputting the selected data, a third switch 56 for selecting the phase error data from the divide-by-4 circuit 52 or the zero data and outputting the selected data, and a third switch 57 for selecting the phase error data from the divide-by-8 circuit 53 or the zero data and outputting the selected data.

The gain correction circuit 39 also includes an addition unit 66 for summing data supplied via the first to fourth switches 54 to 57, that is the phase error data or the zero data, to the phase error data supplied via the input terminal 50.

With the above-described gain correction circuit 39, the phase error data from the phase generator 23 is supplied via the input terminal 50 to the addition unit 66 and to an input terminal 54b of the first switch 54, while being supplied to the divide-by-2 circuit 51, divide-by-4 circuit 52 and to the divide-by-8 circuit 53.

The zone-setting data from the zone-setting register 32 are supplied via the input terminals 62 to 65 to the first to fourth switches 54 to 57, respectively.

The divide-by-2 circuit 51, divide-by-4 circuit 52 and the divide-by-8 circuit 53 multiply the phase error data by ½ and ⅛, respectively, and transmit the resulting data to input terminals 55a, 56a and 57a of the second to fourth switches 55 to 57, respectively.

Based on the zone setting data, the switches 54 to 57 select the input terminals 54a or 54b, the input terminals 55a or 55b, the input terminals 56a or 56b and the input terminals 57a or 57b, to be connected to the output terminals 54a to 57a, and transmit the selected data to the addition unit 66.

Specifically, if the pickup is located at the zone 0 on the magneto-optical disc 1, the zone setting data indicating the zone 0 are supplied to the switches 54 to 57.

When fed with the zone setting data, the first switch 54 selects the input terminal 54b to be connected to its output terminal 54a. The switches 54 to 57 select the input terminals 55c to 57c to be connected to their output terminals 55a to 57a, respectively.

Thus the addition unit 66 is supplied with the phase error data via the input terminal 50 and with the phase error data via the first switch 54, while zero data is supplied from the switches 55 to 57 to the addition unit 66, The addition unit 66 sums the two phase error data to supply the resulting sum data to the positive phase outputting unit 30 shown in FIG. 5.

On the other hand, if the pickup is positioned at the zone 5 of the magneto-optical disc 1, the zone setting data indicating the zone 5 is supplied to each of the switches 54 to 57, When the zone setting data is supplied, the third switch 56 causes the input terminal 56b to be selected and connected to the output terminal 56a, The remaining switches 54, 55 and 57 select the input terminals 54c, 55c and 57c.

This causes the phase error data via the input terminal 50 and the phase error data via the divide-by-4 circuit 52, multiplied by ¼, to be coupled via the third switch 56 to the addition unit 66. Zero-data are supplied by the remaining switches 54, 55 and 57 to the addition unit 66.

The addition unit 66 sums the phase error data to the phase error data multiplied by ¼ to route the resulting data via an output terminal 67 to the positive phase difference outputting unit 30 shown in FIG. 5.

With the magneto-optical disc 1 of the CAV system, the lengths of the pits making up the servo pattern towards the outer periphery of the disc differ from those towards the inner periphery of the disc, such that the frequency characteristics of the servo pattern detection data are deteriorated towards the outer periphery of the disc, However, by detecting the recording/replay position from the pickup location on the magneto-optical disc 1, and by correcting the phase error difference detection data depending on the results of detection, it becomes possible to output channel clocks phased in correspondence with the recording/replay position on the magneto-optical disc 1 and to prevent in this manner the deterioration of the frequency characteristics of the servo pattern detection data towards the outer periphery of the magneto-optical disc 1.

The present invention may also be applied to a so-called zone CAV system in which the analog playback signals are digitized by clocks produced by frequency division of the channel clocks with different values depending on the above-mentioned zone setting data.

Although the servo pattern recorded on the magneto-optical disc 1 is constituted by wobble pits in the above-described embodiment, any pattern formed by pits other than the wobble pits may be employed if such pattern can be recognized to be a servo pattern.

In the above embodiment, the channel clocks are formed by detecting the servo pattern from the magneto-optical disc 1 in which only the servo patterns are formed by pits. Alternatively, the channel clocks may also be formed by detecting the servo pattern from the optical disc in which the recording data as well as the servo patterns are recorded by pits, or from the magnetic disc 1 on which the servo patterns are formed magnetically.

Consequently, the optical disc or the magnetic disc may be employed as the disc-shaped recording medium employed with the recording and/or reproducing device, in place of the magneto-optical disc 1 as used in connection with the above-described embodiments.

What is claimed is:

1. A disc driving device for driving a disc-shaped recording medium of the sampled-servo system on which pre-set servo patterns are recorded at pre-set intervals, comprising
    reproducing means for reproducing said servo patterns for outputting analog replay signals,
    analog-to-digital converting means for digitizing said analog replay signals responsive to a channel clock signal to produce digital replay signals,
    first phase difference generating means for generating a first phase difference signal by a predetermined process on the basis of a plurality of digital data which form said digital replay signals,
    servo pattern detection means for detecting coincidence of a pattern of said plurality of digital data with a predetermined pattern of digital data corresponding to said servo patterns,
    replay servo pattern detection means for detecting the time which elapses from the detection by said servo pattern detection means of the coincidence of the pattern of said plurality of digital data with said predetermined pattern of digital data until a subsequent time when the coincidence of the pattern of said plurality of digital data with said predetermined pattern of digital data is detected again by said servo pattern detection means,
    second phase difference generating means for generating a second phase difference signal indicating a pre-set amount of phase difference between said channel clock signal and said detected coincidence of the pattern of said plurality of digital data with said predetermined pattern of digital data,
    selecting means for selectively outputting said first phase difference signal or said second phase difference signal,
    control means for controlling said selecting means so that said first phase difference signal is outputted when said time as detected by said servo pattern detection means is within a pre-set range and said second phase difference signal is outputted when said time is outside said pre-set range, and
    channel clock generating means for generating said channel clocks phase-corrected depending on said first or second phase difference signals supplied by said selecting means.

2. The disc drive device as claimed in claim 1 wherein said second phase difference generating means comprises a positive phase difference generator outputting a positive phase difference signal indicating the positive phase difference and a negative phase difference generator outputting a negative phase difference signal indicating a negative phase difference.

3. The disc drive device as claimed in claim 1 further comprising:

position detection means for detecting a radial position of the disc-shaped recording medium at which said reproducing means is reproducing data, and gain correcting means for amplifying the first phase difference signal with variable gain depending on the results of detection by said position detecting means, said gain correcting means changing over said gain depending on the radial position of said disc-shaped recording medium at which said reproducing means is reproducing data.

* * * * *